(12) United States Patent
Dalmatov et al.

(10) Patent No.: US 11,507,290 B2
(45) Date of Patent: Nov. 22, 2022

(54) METHOD AND APPARATUS FOR STORAGE DEVICE MANAGEMENT

(71) Applicant: EMC IP Holding Company LLC, Hopkinton, MA (US)

(72) Inventors: Nickolay Dalmatov, St. Petersburg (RU); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 12 days.

(21) Appl. No.: 16/830,386

(22) Filed: Mar. 26, 2020

(65) Prior Publication Data

US 2021/0034242 A1 Feb. 4, 2021

(51) Int. Cl.
| | |
|---|---|
| *G06F 3/06* | (2006.01) |
| *G06F 12/10* | (2016.01) |
| *G06F 11/30* | (2006.01) |
| *G06N 20/00* | (2019.01) |
| *G06F 12/1009* | (2016.01) |

(52) U.S. Cl.
CPC ............ *G06F 3/064* (2013.01); *G06F 3/0611* (2013.01); *G06F 3/0658* (2013.01); *G06F 3/0688* (2013.01); *G06F 11/3034* (2013.01); *G06F 12/1009* (2013.01); *G06N 20/00* (2019.01); *G06F 2212/7201* (2013.01)

(58) Field of Classification Search
CPC .... G06F 3/064; G06F 12/1009; G06F 3/0611; G06F 3/0688; G06F 11/3034; G06F 3/0658; G06F 2212/7201; G06F 11/3409; G06N 20/00
See application file for complete search history.

(56) References Cited

U.S. PATENT DOCUMENTS

| | | | | |
|---|---|---|---|---|
| 2014/0122776 | A1* | 5/2014 | El Maghraoui | G06F 12/0246 711/103 |
| 2014/0281366 | A1* | 9/2014 | Felch | G06F 9/355 711/207 |
| 2014/0372346 | A1* | 12/2014 | Phillipps | G06N 20/00 706/12 |
| 2019/0334801 | A1* | 10/2019 | Dutta | G06F 11/3006 |
| 2020/0110536 | A1* | 4/2020 | Navon | G06F 3/0613 |
| 2020/0410390 | A1* | 12/2020 | Fu | G06F 11/3466 |

* cited by examiner

*Primary Examiner* — Masud K Khan
(74) *Attorney, Agent, or Firm* — Daly, Crowley Mofford & Durkee, LLP

(57) ABSTRACT

A method for provided use in a storage device having a controller, the method comprising: identifying, by the controller, a plurality of logical regions in the storage device; obtaining, by the controller, a respective usage metric for each of the logical regions; updating, by the controller, a translation data structure of the storage device, the translation data structure being updated to map any of the logical regions of the storage device to a respective physical portion of the storage device, the respective physical portion being selected based on the respective usage metric of the logical region, wherein the translation data structure is part of a flash translation layer of the storage device, and the translation data structure is configured to store mapping information between a logical address space of the storage device and a physical address space of the storage device.

18 Claims, 8 Drawing Sheets

| | LOGICAL ADDRESS | | PHYSICAL ADDRESS | | |
|---|---|---|---|---|---|
| 302A | logical_addr_3 (low write frequency) | 304C | phys_addr_1 | 306A | 308A |
| 302B | logical_addr_1 (low write frequency) | 304A | phys_addr_2 | 306B | |
| 302C | logical_addr_7 (high write frequency) | 304G | phys_addr_3 | 306C | |
| 302D | logical_addr_2 (high write frequency) | 304B | phys_addr_4 | 306D | |
| 302E | logical_addr_8 (low write frequency) | 304H | phys_addr_5 | 306E | 308B |
| 302F | logical_addr_11 (high write frequency) | 304K | phys_addr_6 | 306F | |
| 302G | logical_addr_12 (high write frequency) | 304L | phys_addr_7 | 306G | |
| 302H | logical_addr_6 (low write frequency) | 304F | phys_addr_8 | 306H | |
| 302I | logical_addr_5 (low write frequency) | 304E | phys_addr_9 | 306I | 308C |
| 302J | logical_addr_9 (low write frequency) | 304I | phys_addr_10 | 306J | |
| 302K | logical_addr_4 (low write frequency) | 304D | phys_addr_11 | 306K | |
| 302L | logical_addr_10 (high write frequency) | 304J | phys_addr_12 | 306L | |

FIG. 3A

| | LOGICAL ADDRESS | | PHYSICAL ADDRESS | | |
|---|---|---|---|---|---|
| 302A | logical_addr_3 (low write frequency) | 304C | phys_addr_1 | 306A | 308A |
| 302B | logical_addr_1 (low write frequency) | 304A | phys_addr_2 | 306B | |
| 302C | logical_addr_8 (low write frequency) | 304H | phys_addr_3 | 306C | |
| 302D | logical_addr_6 (low write frequency) | 304F | phys_addr_4 | 306D | |
| 302E | logical_addr_7 (high write frequency) | 304G | phys_addr_5 | 306E | 308B |
| 302F | logical_addr_11 (high write frequency) | 304K | phys_addr_6 | 306F | |
| 302G | logical_addr_12 (high write frequency) | 304L | phys_addr_7 | 306G | |
| 302H | logical_addr_2 (high write frequency) | 304B | phys_addr_8 | 306H | |
| 302I | logical_addr_5 (low write frequency) | 304E | phys_addr_9 | 306I | 308C |
| 302J | logical_addr_9 (low write frequency) | 304I | phys_addr_10 | 306J | |
| 302K | logical_addr_4 (low write frequency) | 304D | phys_addr_11 | 306K | |
| 302L | logical_addr_10 (high write frequency) | 304J | phys_addr_12 | 306L | |

FIG. 3B

METHOD AND APPARATUS FOR STORAGE DEVICE MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for provided use in a storage device having a controller, the method comprising: identifying, by the controller, a plurality of logical regions in the storage device; obtaining, by the controller, a respective usage metric for each of the logical regions; updating, by the controller, a translation data structure of the storage device, the translation data structure being updated to map any of the logical regions of the storage device to a respective physical portion of the storage device, the respective physical portion being selected based on the respective usage metric of the logical region, wherein the translation data structure is part of a flash translation layer of the storage device, and the translation data structure is configured to store mapping information between a logical address space of the storage device and a physical address space of the storage device.

According to aspects of the disclosure, a storage device is provided comprising, comprising: a plurality of memory banks; a processing circuitry operatively coupled to the memory banks the processing circuitry being configured to perform the operations of: identifying a plurality of logical regions in the storage device; obtaining a respective usage metric for each of the identified logical regions; updating a translation data structure of the storage device, the translation data structure being updated to map any of the logical regions of the storage device to a respective physical portion of the storage device, the respective physical portion being selected based on the respective usage metric of the logical region, wherein the translation data structure is part of a flash translation layer of the storage device, and the translation data structure is configured to store mapping information between a logical address space of the storage device and a physical address space of the storage device.

According to aspects of the disclosure, a non-transitory computer-readable medium storing one or more processor-executable instructions, which when executed by a processing circuitry of a storage device cause the processing circuitry to perform the operations of: identifying a plurality of logical regions in the storage device; obtaining a respective usage metric for each of the identified logical regions; updating a translation data structure of the storage device, the translation data structure being updated to map any of the logical regions of the storage device to a respective physical portion of the storage device, the respective physical portion being selected based on the respective usage metric of the logical region, wherein the translation data structure is part of a flash translation layer of the storage device, and the translation data structure is configured to store mapping information between a logical address space of the storage device and a physical address space of the storage device.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3A is a diagram of an example of a translation table before the translation table has been reconfigured by a controller of the storage device of FIG. 2, according to aspects of the disclosure;

FIG. 3B is a diagram of the translation table of FIG. 3A, after the translation table has been reconfigured by the controller of the storage device of FIG. 2, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1A:
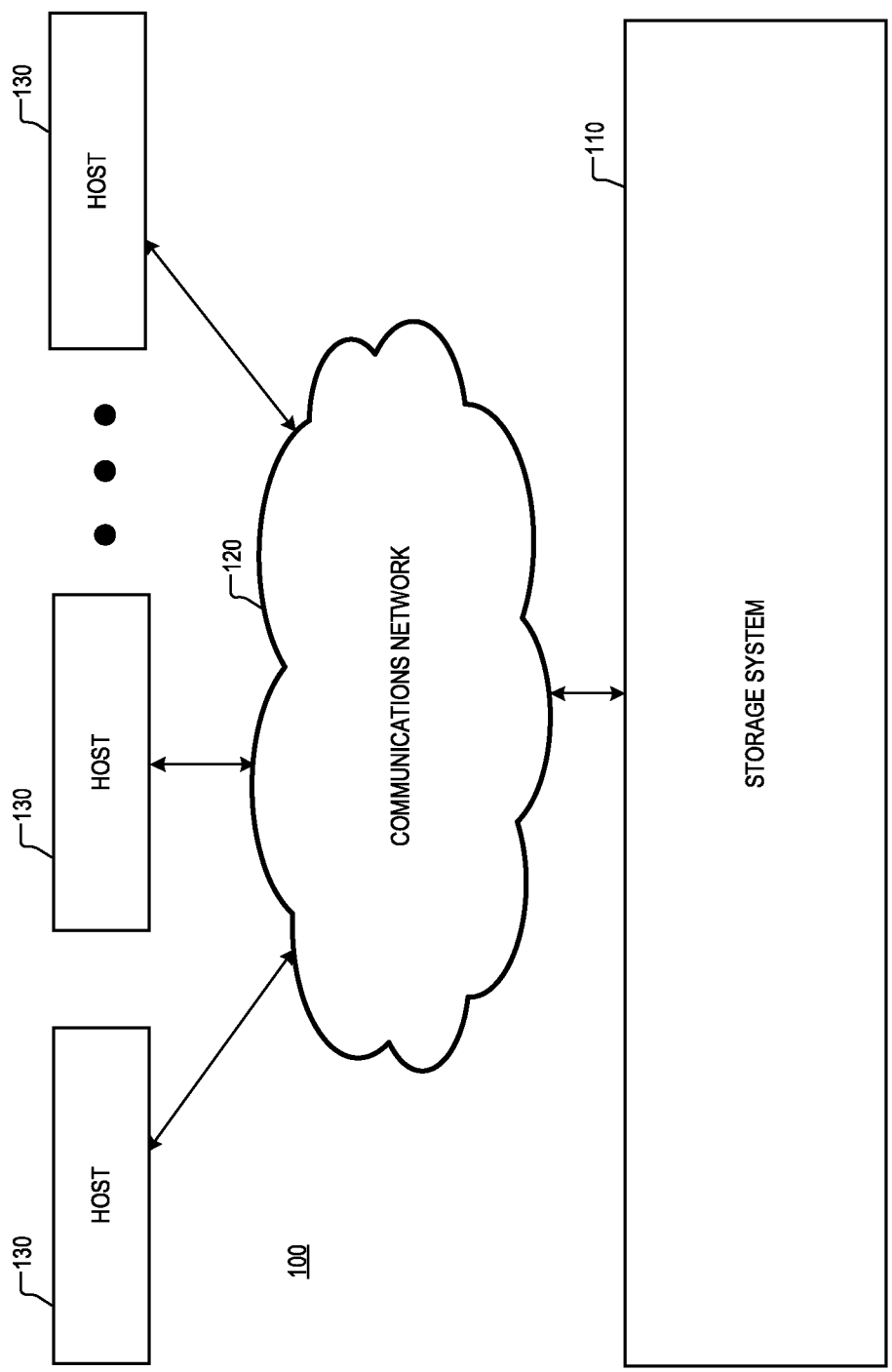
FIG. 1A is a diagram of an example of a system, according to aspects of the disclosure.

FIG. 1A is a diagram of an example of a system 100, according to aspects of the disclosure. The system 100 may include a storage system 110 that is coupled to one or more host devices 130 via a communications network 120. The storage system 110 may include a midrange storage system, an enterprise storage system, and/or any other suitable type of storage system. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device.

Figure 1B:
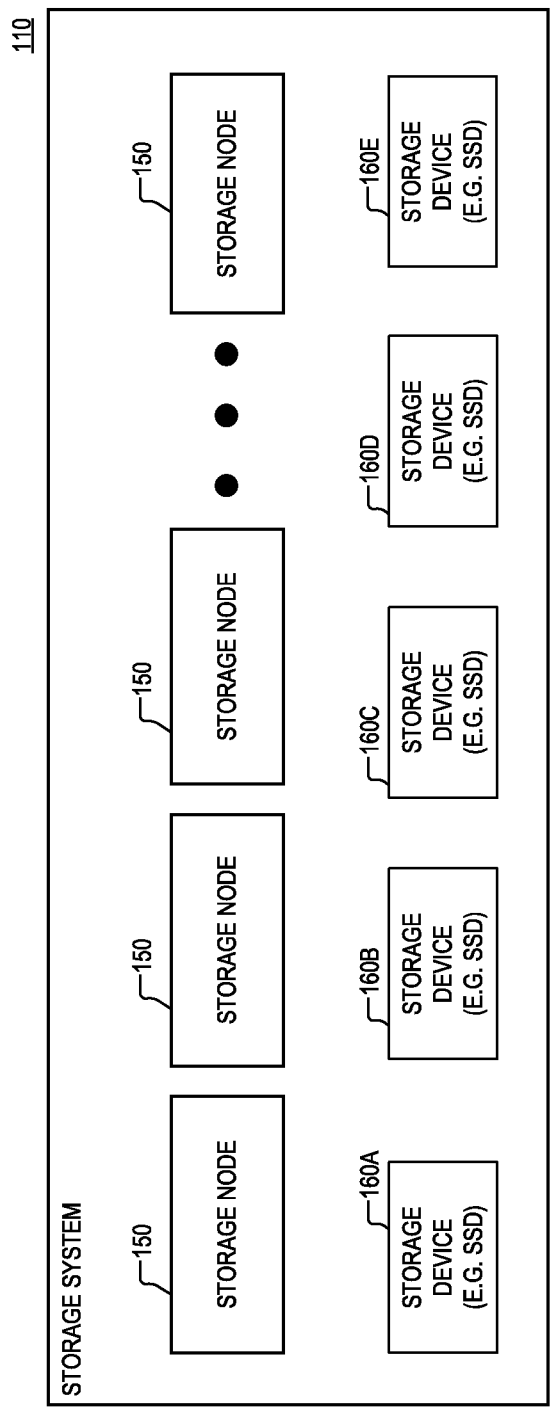
FIG. 1B is a diagram of an example of a storage system, according to aspects of the disclosure.

FIG. 1B is a diagram of the storage system 110, according to aspects of the disclosure. The storage system 110 may include a plurality of storage nodes 150, and a plurality of storage devices 160. Each of the storage nodes 150 may include any suitable type of computing device, such as a storage server, a desktop computer, a laptop, etc. Each of the storage devices 160 may include one or more of a flash drive, an EEPROM drive, a non-volatile RAM (nvRAM) and/or any other suitable type of solid-state or other storage device. According to the present disclosure, each of the storage devices 160 includes a Solid-State Drive (SSD).

Figure 2:
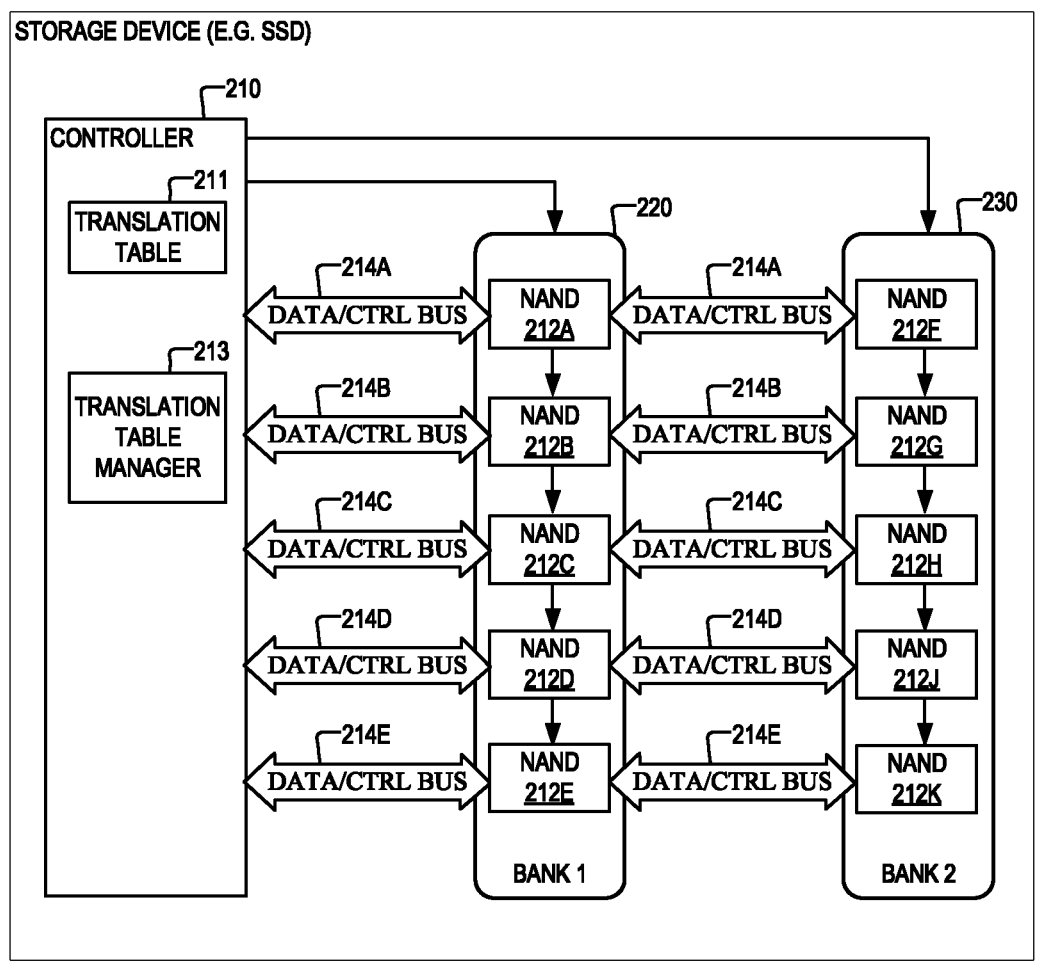
FIG. 2 is a diagram of an example of a storage device, according to aspects of the disclosure.

FIG. 2 shows an example of an storage device 160, according to aspects of the disclosure. As illustrated, the storage device 160 may include a controller 210, a first NAND bank 220, and a second NAND bank 230. The controller 210 may include any suitable type of processing circuitry that is configured to service I/O requests that are received at the storage device 160 from one of the storage nodes 150. In some implementations, the controller 210 may include a general-purpose processor (e.g., an ARM-based processor), an application-specific integrated circuit (ASIC), a Field-Programmable Gate Array (FPGA) and/or any other suitable type of processing circuitry.

The first NAND bank 220 may include a plurality NAND dies 212A-E, and the second NAND bank 230 may include a plurality of NAND dies 212F-K. Each of the plurality of NAND dies 212 may include a plurality of memory cells that are directly addressable by the controller 210. More specifically, in some implementations, NAND dies 212A and 212F may be coupled to the controller 210 via a first channel 214A; NAND dies 212B and 212F may be coupled to the controller 210 via a second channel 214B; NAND dies 212C and 212H may be coupled to the controller 210 via a third channel 214C; NAND dies 212D and 212J may be coupled to the controller 210 via a fourth channel 214D; and NAND dies 212E and 212K may be coupled to the controller via a fifth channel 214E. In some implementations, NAND dies 212 that are on different channels 214 may be accessed in parallel by the controller 210.

The controller 210 may implement a translation table 211 and a translation table manager 213, as shown. The translation table 211 may map a logical address space of the storage device 160 to the SSD's physical address space. The logical address space may include a plurality of logical addresses, wherein each logical address uniquely identifies a different page of data that is stored in the storage device 160. The physical address space may include a plurality of physical addresses, wherein each physical address uniquely identifies a specific set of memory cells that form the physical medium on which a page of data is stored. The translation table 211 may thus map each of the addresses in the logical address space of the storage device 160 to a respective physical address that corresponds to a specific set of memory cells (that form a page).

In some implementations, data may be written to the storage device 160 in pages. However, at the hardware level, memory cells in the storage device 160 may be modified in larger units, known as "memory blocks," which are made of multiple pages. Moreover, data that is once stored in a memory block cannot be modified any further because of physical and electrical limitations that are inherent in flash memory. Rather, when data stored in a memory block (hereinafter "original memory block") needs to be modified, this data is: (i) retrieved from the original memory block, (ii) stored in volatile memory, (iii) modified while it is stored in volatile memory, and (iv) copied from volatile memory into another memory block of the storage device 160. After the modified data is stored in the other memory block, the original memory block is erased and reused. Moreover, after the modified data is stored in the other memory block, the translation table may be updated to identify the other memory block as the physical medium for logical addresses that were previously associated with the original memory block.

This cycle of erasing and copying data to new memory blocks, when a page in the logical address space of the storage device 160 needs to be updated, can be at least partially transparent to software and/or hardware that uses the storage device 160. As a result, both short-lived data and long-lived data may be stored in the same memory block. According to the present example, short-lived data may be data that is updated frequently. And long-lived data may be data that is updated infrequently. Thus, when the short-lived data in a memory block is updated, the long-lived data that is stored on the same memory block also needs to be erased and copied to a new memory block, even though no changes are being made to the long-lived data. This cycle of unnecessary copying and erasing of long-lived data can increase the wear on the storage device 160 and is sometimes referred to as write-amplification.

According to the present example, the controller 210 is configured to minimize write amplification by executing the translation table manager 213. In some implementations, the translation table manager 213 may be configured to: (i) monitor the usage of the storage device 160, (ii) group logical addresses that are written to (or read from) at the same (or similar) rate, and (iii) re-configure the translation table 211 so that the grouped logical addresses are mapped the same memory block. Re-configuring the translation table 211 in this way may help reduce the likelihood of short-lived data and long-lived data being stored in the same memory, thereby reducing write amplification.

FIGS. 3A and 3B show the state of the translation table before and after it has been modified by the translation manager 313. As illustrated, the translation table 211 may include a plurality of entries 302. Each entry 302 may map a different logical addresses 304 to a corresponding physical address 306. Each logical address 304 may uniquely identify a different page in the logical address space of the storage device 160, and each physical address 306 may uniquely identify one or more memory cells in the storage device 160 where a page of data can be stored. Furthermore, each set of four consecutive physical addresses 306 may be associated with a different memory block 308 of the storage device 160. Specifically, physical addresses 306A-D may form a memory block 308A; physical addresses 306E-H may form a memory block 308B; and physical addresses 306I-L may form a memory block 308C.

According to the example of FIGS. 3A-B, each of the logical address 304 is classified in accordance with the rate at which write requests are received for that logical address. Under the nomenclature of the present disclosure, if the arrival rate of write requests for a particular logical address is high, this logical address is herein referred to as a "high-write-frequency logical address." On the other hand, if the arrival rate of write requests for a particular logical address is low, this logical address is herein referred to as a "low-write-frequency logical address."

FIG. 3A shows the state of the translation table 211 before it has been re-configured by the translation table manager 312. According to the example of FIG. 3A: logical address 304c is a low-write-frequency logical address, and it is mapped to physical address 306a by entry 302a; logical address 304a is a low-write-frequency logical address, and it is mapped to physical address 306b by entry 302b; logical address 304g is a high-write-frequency logical address, and it is mapped to physical address 306c by entry 302c; logical address 304b is a high-write-frequency logical address, and it is mapped to physical address 306d by entry 302d; logical address 304h is a low-write-frequency logical address, and it is mapped to physical address 306e by entry 302e; logical address 304k is a high-write-frequency logical address, and it is mapped to physical address 306f by entry 302f; logical address 304l is a high-write-frequency logical address, and it is mapped to physical address 306g by entry 302g; logical address 304f is a low-write-frequency logical address, and it is mapped to physical address 306h by entry 302h; logical address 304e is a low-write-frequency logical address, and it is mapped to physical address 306i by entry 302i; logical address 304i is a low-write-frequency logical address, and it is mapped to physical address 306j by entry 302j; logical address 304d is a low-write-frequency logical address, and it is mapped to physical address 306k by entry 302k; logical address 304j is a high-write-frequency logical address, and it is mapped to physical address 306l by entry 302l.

FIG. 3B shows the state of the translation table 211 after it has been re-configured by the translation table manager 312. According to the example of FIG. 3B, reconfiguring the translation table 211 includes performing the following actions: (i) updating the translation table 211 to map logical address 304h to physical address 306c (see entry 302c); (ii) updating the translation table 211 to map logical address 304F is to physical address 306d (see entry 302d); (iii) updating the translation table 211 to map logical address 304g to physical address 306e (see entry 302e); and (iv) updating the translation table 211 to map logical address 304b to physical address 306H (see entry 302h).

According to the example of FIGS. 3A-B, before the translation table 211 is reconfigured, each of the memory blocks 308A and 308B is mapped to both high-write-frequency and low-write-frequency logical addresses 304 (see FIG. 3A). By contrast, after the translation table 211 is reconfigured, the memory block 308A is mapped only to low-write-frequency logical addresses 304, and the memory block 308B is mapped only to high-write-frequency logical addresses 304 (see FIG. 3B). In some respects, mapping, to the same memory block 308, logical addresses 304 that have the same (or similar) write frequency may help reduce the amount of write amplification that occurs within the storage device 160.

FIGS. 3A-B are provided as an example only. Although translation table 211 is depicted as including only twelve entries 302, it will be understood that the translation table 211 may in practice include a much larger number of entries 302. Furthermore, although in the example of FIGS. 3A-B each of the memory blocks 308 is mapped to only four logical addresses 304, it will be understood that the present disclosure is not limited to any specific memory block size. And still furthermore, the term "translation table," as used throughout the disclosure, can refer to any type of data structure that maps logical addresses to physical addresses (e.g., a tree structure, a two-dimensional array, etc.). In this regard, the present disclosure is not limited to any specific implementation of the translation table 211. Although in the example of FIGS. 3A-3B, the logical addresses 304 are grouped based on their respective write rates, it will be understood that the present disclosure is not limited to using any specific usage metric for grouping the logical addresses.

Figure 4:
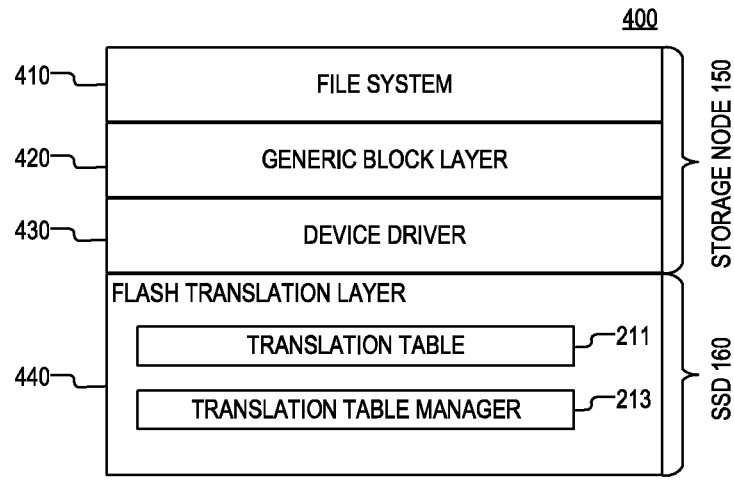
FIG. 4 is a diagram of an example of a processing stack, according to aspects of the disclosure.

FIG. 4 shows an example of a processing stack 400 that is used by the storage system 110 to save and retrieve data. As illustrated, the stack 400 may include a file system 410, a generic block layer 420, a device driver 430, and a flash translation layer 440. The file system 410, the generic block layer 420, and the device driver 430 may be executed on any of the storage nodes 150 (shown in FIG. 1B). The flash translation layer 440 may be implemented in the storage device 160 (shown in FIG. 2). In this regard, according to the example of FIG. 4, the translation table 211 and the translation table manager 213 are implemented in the flash translation layer 440. However, it will be understood that alternative implementations are possible in which at least some of translation table manager 213 and/or at least some of the translation table 211 is implemented at another location in the stack 400.

The components of the stack 400 are now described in further detail. The file system 410 may be associated with a particular volume (and/or logical unit) in the storage system 110, and it may implement a data store for saving, retrieving, and updating files. The generic block layer 420 may include a kernel component that handles requests (from the file system 410) for various storage devices and interacts with the device drivers of those devices to fulfill the requests. The device driver 430 may provide an interface, to the generic block layer 420, for interacting with the storage device 160. In this regard, the device driver 430 may be configured to interact with the flash translation layer 440 to store and retrieve data from the storage device 160. The flash translation layer 440 may emulate a standard block device by exposing read/write operations to device driver 430 while hiding the erase-before-write characteristics of the storage device 160. As discussed above, the flash translation layer 440 may provide logical-to-physical address mapping. In addition, in some implementations, the flash translation layer 440 may provide garbage collection and/or wear-leveling capabilities to the storage device 160. In the example of FIG. 4, the flash translation layer 440 is implemented in software. However, alternative implementations are possible in which the flash translation layer 440 is implemented in hardware or as a combination of software and hardware. Stated succinctly, the present disclosure is not limited to any specific implementation of the flash translation layer 440.

Figure 5:
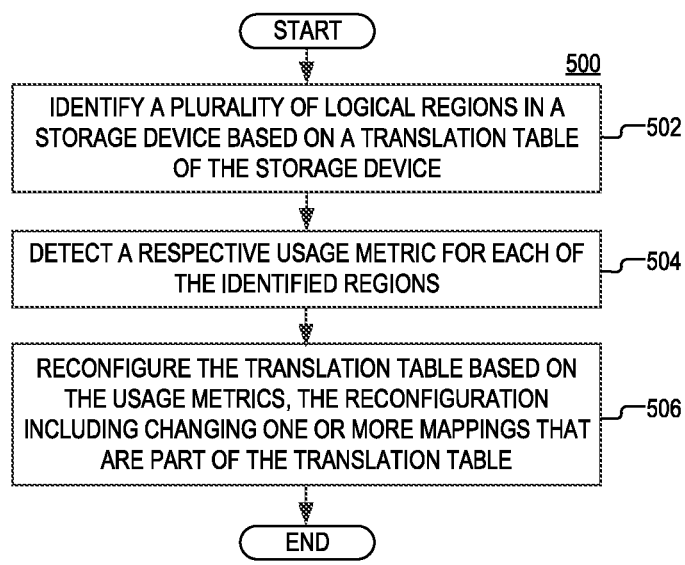
FIG. 5 is a flowchart of an example of a process, according to aspects of the disclosure.

FIG. 5 is a flowchart of an example of a process 500 for reconfiguring the translation table 211 of the storage device 160. In some implementations, the process 500 may be performed by the translation table manager 213. Additionally or alternatively, in some implementations, the process 500 may be performed by the controller 210 of the storage device 160. Additionally or alternatively, in some implementations, the process 500 may be performed repeatedly during the operation of the storage device 160, so as to adapt the storage device 160 to changing operational demands that occur during a particular time period. For example, the process 500 may be performed every hour, every day, every week, and/or at any other suitable time interval.

At step 502, a plurality of logical regions are identified in the storage device. In some implementations, each of the logical regions may include (and/or consist of) only one logical address 304. Alternatively, in some implementations, each of the logical regions may include (and/or consist of) a plurality of logical addresses 304.

At step 504, a respective usage metric is detected for each of the logical regions. In some implementations, the respective usage metric for any given logical region may be a past usage metric. The past usage metric may indicate the level of (a particular type of) load, which the given logical region has experienced during a past time window. Additionally or alternatively, in some implementations, the respective usage metric for any given logical region may include a future usage metric. The future usage metric may indicate the level of (of a particular type of) load, which the given logical region is expected to experience during a future time period.

In some implementations, a future usage metric for any of the logical regions may be determined by using a machine learning engine. An example of a machine learning engine for determining future usage metrics is discussed further below with respect to FIG. 6.

At step 506, the translation table 211 is reconfigured based on the usage metrics determined at step 504. In some implementations, reconfiguring the translation table 211 may include modifying one or more entries 302 in the translation table 211 to change the mappings between different logical and physical addresses. In some implementations, step 504 may be performed in accordance with a process 700, which is discussed further below with respect to FIG. 7.

Additionally or alternatively, in some implementations, reconfiguring the translation table 211 may include mapping, to any of the memory blocks 308, logical addresses 304 that have experienced the same (or similar) load. Additionally or alternatively, reconfiguring the translation table 211 may include mapping, to any of the memory blocks 308, logical addresses 304 that are expected to experience the same (or similar) load.

Additionally or alternatively, in some implementations, the wear level of one or more memory blocks 308 may be taken into consideration when the translation table 211 is reconfigured. In such implementations, reconfiguring to translation table 211 may include: (i) mapping logical addresses 304, which are expected to experience a low load during a future time window, to memory blocks 308 that have a high wear level, and (ii) mapping logical addresses 304, which are expected to experience a high load during the future time window, to memory blocks 308 that have a low wear level. Additionally or alternatively, in some implementations, reconfiguring to translation table 211 may include: (i) mapping logical addresses 304, which are have experienced a low load during a past time window, to memory blocks 308 that have a high wear level, and (ii) mapping logical addresses 304, which have experienced a high load during the past time window, to memory blocks 308 that have a low wear-level. As can be readily appreciated, taking the wear of different memory blocks 308 when the translation table 211 is reconfigured may help wear-balance the storage device 160 better.

According to aspects of the disclosure, a past usage metric for any of the logical regions may include (or otherwise be based on) one or more of: (i) a count of write requests that are received for one or more logical addresses in the region during a past time window, (ii) a count of read requests that are received for one or more logical blocks in the region during a past time window; (iii) a rate at which write requests are received for one or more logical addresses in the region during a past time window, (iv) a rate at which read requests are received for one or more logical addresses in the region during a past time window, (v) a read-to-write ratio for one or more logical addresses in the logical region during a past time window, and/or (vi) any other suitable measure of load on the logical region. According to aspects of the disclosure, a future usage metric for any of the logical regions may include (or otherwise be based on) one or more of: (i) a count of write requests that are expected to be received for one or more logical addresses in the region during a future time window, (ii) a count of read requests that are expected to be received for one or more logical blocks in the region during a future time window; (iii) a rate at which write requests are expected to be received for one or more logical addresses in the region during a future time window, (iv) a rate at which read requests are expected to be received for one or more logical addresses in the logical region during a future time window, (v) a read-to-write ratio that is predicted to occur for one or more logical addresses in the logical region during a past time window, and/or (vi) any other suitable measure of load on the logical region.

Figure 6:
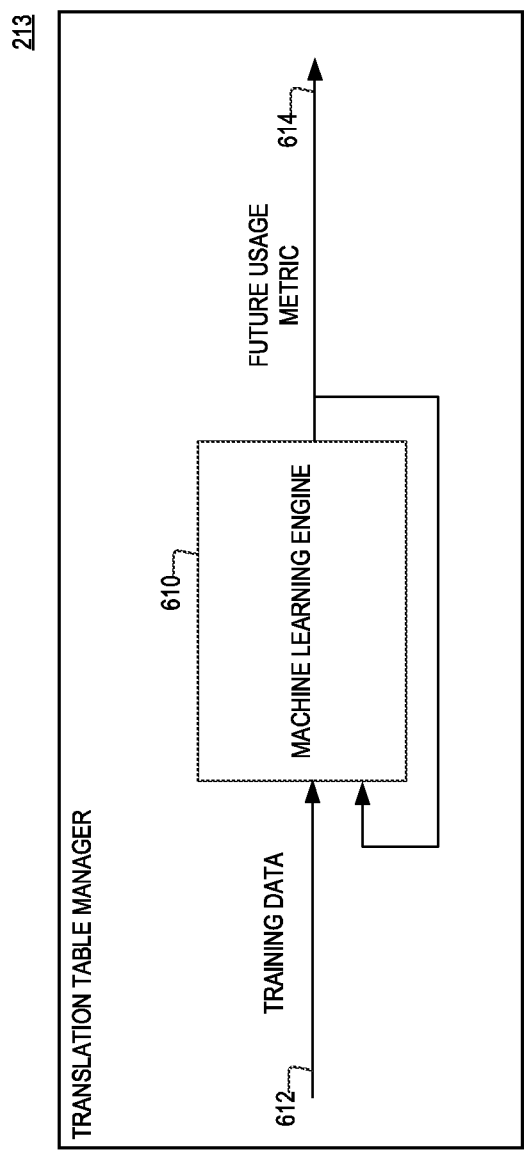
FIG. 6 is a diagram illustrating the operation of a translation table manager, according to aspects of the disclosure.

FIG. 6 is a schematic diagram illustrating the operation of the translation table manager 213 in further detail. As illustrated, the translation table manager 213 may be configured to execute a machine learning engine 610. The machine learning engine 610 may implement any suitable type of online or offline machine learning algorithm, such as Least Absolute Shrinkage and Selection Operator (LASSO), Stochastic Gradient Descent, Progressive Learning, or online convex optimization, for example. In operation, the machine learning engine 610 may receive training data 612 and output a future usage metric 614 that is generated based on the training data 612.

The future usage metric 614 may correspond to any given one of the logical regions identified at step 502. The training data 612 may include the values of one or more past usage metrics for the given logical region and/or other ones of the logical regions identified at step 502. For example, the training data 612 may include the read-to-write ratio of the given logical region (or another type of usage metric) during a set of past time windows, and the future usage metric 614 may include an expected read-to-write ratio for the given logical during a future time window. As another example, the training data 612 may include the read-to-write ratio for a plurality of the logical regions (or another type of usage metric) during a set of past time windows, and the future usage metric 614 may include the expected read-to-write ratio for the given logical region during a future time window. In the latter example, the plurality of logical regions that is associated with the training data 612 may or may not include the given logical region. Stated succinctly, the present disclosure is not limited to using any specific type of training data on the machine learning engine 610.

Figure 7:
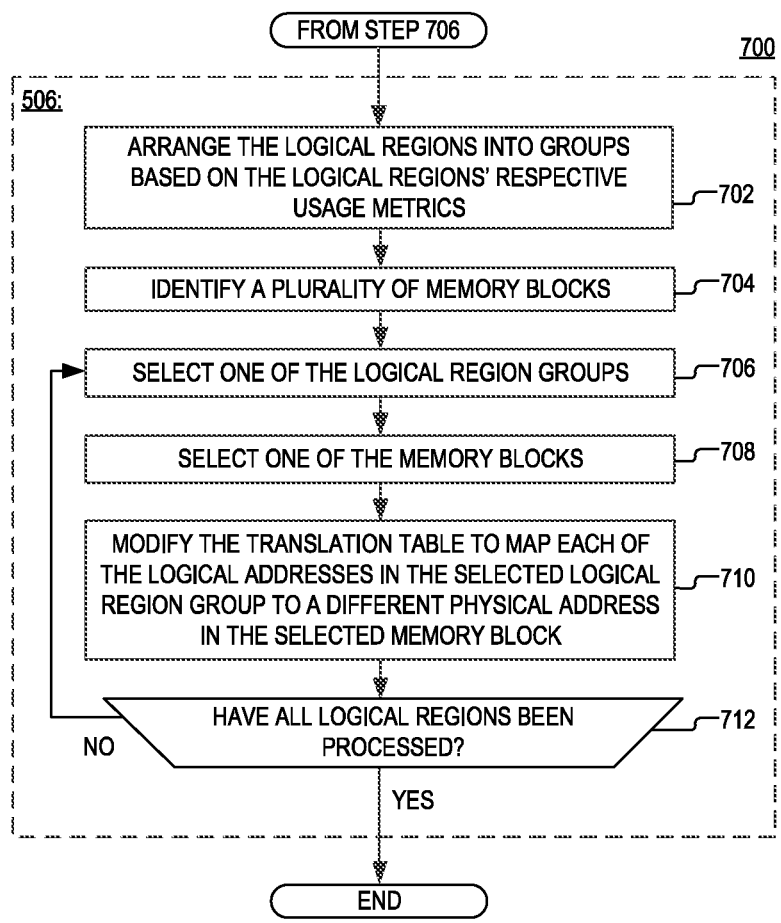
FIG. 7 is a flowchart of an example of a process, according to aspects of the disclosure.

FIG. 7 is a flowchart of an example of a process 700 for reconfiguring the translation table 211, as specified by step 506 of the process 500. At step 702, the logical regions are arranged in groups, wherein the count of logical addresses 304 in each group is the same as the count of logical addresses 304 that are mapped to each memory block 308 (e.g., four, etc.) by the translation table 211. At step 704, a plurality of memory blocks 308 in the storage device 160 is identified. At step 706, one of the logical region groups is selected. At step 708, one of the memory blocks is selected. In some implementations, the memory block may be selected based on a wear level of the memory block and/or one or more usage metrics of the logical regions in the selected logical region group. As can be readily appreciated, each of the memory blocks 308 in the storage device 160 may be selected only once during the execution of the process 700. At step 710, the translation table 211 is modified to map each of the logical addresses 304 in the selected logical region group to a different physical address 306 in the selected memory block 308. At step 712, a determination is made if there are any more logical region groups that remain to be processed. If there are any other logical region groups that remain to be processed, the process 700 returns to step 706, and steps 706-710 are executed again for one of the logical region groups that has not been processed yet. Otherwise, if there are no more logical region groups that remain to be processed, the process 700 ends.

In some implementations, the logical regions may be grouped, at step 702, based on their respective usage metrics. For example, the logical regions may be grouped such that the distance between the smallest usage metric value in at least one (or each) group and the largest usage metric value in the same group is minimized. As another example, the logical regions may be grouped, such that the usage metrics of the logical regions in at least one of the groups have matching values. For example, the usage metrics of the logical regions in a group may have matching values if they are within a predetermined distance from another (or if they are within a predetermined distance from a baseline value). As another example, the usage metrics of the logical regions in a group may have matching values if they have a specific distribution (e.g., a distribution having a predetermined mean and deviation, etc.). As used throughout the disclosure, the terms "usage metric" and "usage metric value" are used interchangeably. As used throughout the disclosure, the phrase "smallest usage metric for a logical region group" may refer to the usage metric of a logical region in the group that has the smallest usage metric among all logical regions in the group. Similarly, as used throughout the disclosure, the phrase "largest usage metric for a logical region group" may refer to the usage metric of a logical region in the group that has the largest usage metric among all logical regions in the group.

In some implementations, each logical region group may be mapped to one of the memory blocks 308 (at steps 708-710) based on: (i) the wear level of the memory block, and (ii) one or more usage metrics of the logical regions in the group. In such implementations, memory blocks 308 that have a high wear may be mapped to logical region groups that are associated with low-load usage metrics (e.g., usage metrics indicating low future and/or past load on their respective logical regions). On the other hand, memory blocks 308 that have a low wear may be mapped to logical region groups associated with high-load usage metrics (e.g., usage metrics indicating of low future and/or past load on their respective logical regions). For example, when a given logical region group is selected, the average value of the usage metrics of the logical regions in the group may be calculated. Afterwards, at step 708, the respective wear of all memory blocks 308 (which have not been selected yet) may be determined and subsequently used as a basis for selecting one of the memory blocks 308 whose wear level is commensurate with the average value of the usage metrics. As discussed above, the selected memory block 308, may be subsequently mapped to the given group of logical regions.

Figure 8:
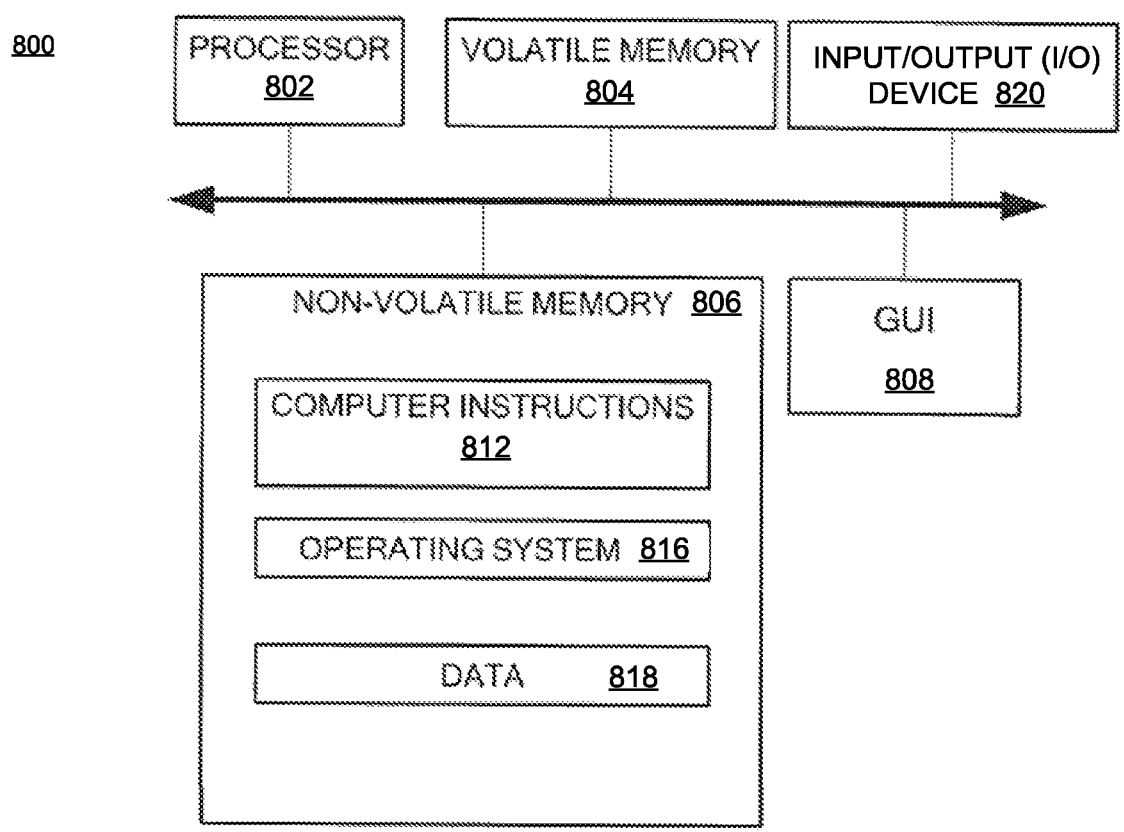
FIG. 8 is a diagram of an example of a computing device, according to aspects of the disclosure.

Referring to FIG. 8, in some implementations, any of the storage nodes 150 may be implemented as one or more computing devices 800. Each computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the process 700 and/or any other function of the storage system 110.

FIGS. 1A-8 are provided as an example only. At least some of the steps discussed with respect to FIGS. 1A-8 may be performed in parallel, in a different order, or altogether omitted. According to the present example, the translation table manager 213 is implemented in software. However, the alternative implementations are possible in which the translation table manager 213 is implemented in hardware or as a combination of hardware and software. Although in the present example, each of the storage devices 160 is a solid-state drive, alternative implementations are possible in which any of the storage devices 160 includes any other suitable type of storage device. Stated succinctly, the processes and techniques provided in the disclosure are not limited to any specific type of storage device.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage device having a controller, the method comprising:
   identifying, by the controller, a plurality of logical regions in the storage device; and
   updating, by the controller, a translation data structure of the storage device, the translation data structure being updated by: calculating a respective predicted load of each of the logical regions by executing a machine learning engine, grouping the logical regions into a plurality of groups based on the predicted loads, and mapping each of the group to a corresponding memory block of the storage device, the corresponding memory block being selected based on a wear level of the corresponding memory block and the predicted loads of the logical regions in the group,
   wherein the translation data structure is part of a flash translation layer of the storage device,
   wherein the translation data structure is configured to store mapping information between a logical address space of the storage device and a physical address space of the storage device, and
   wherein the machine learning engine is executed in the flash translation layer of the storage device, the flash translation layer including an interface that is configured to provide logical-to-physical address mapping for the storage device.

2. The method of claim 1, wherein grouping the logical regions based on the predicted loads causes a distance to be minimized, in any of the groups, between a predicted load of a logical region that has the smallest predicted load in the group and a predicted load of another logical region that has the largest predicted load in the group.

3. The method of claim 1, wherein each of the groups to a respective memory block of the storage device includes assigning each of the groups to a respective contiguous physical portion of the storage device.

4. The method of claim 1, wherein each of the logical regions includes a page.

5. The method of claim 1, wherein the predicted load of any of the plurality of logical regions is based on at least one of (i) a count of write requests that are expected to be received during a future time window, (ii) a count of read requests that are expected to be received during the future time window, (iii) a rate at which write requests are expected to be received during the future time window, (iv) a rate at which read requests are expected to be received during the future time window, and (v) a read-to-write ratio that is expected to occur during the future time window.

6. The method of claim 1, wherein the machine leering engine is trained based on training data, the training data including a read-to-write ratio of any of the logical regions.

7. A storage device, comprising:
   a plurality of memory banks;
   a processing circuitry operatively coupled to the memory banks, the processing circuitry being configured to perform the operations of:
   identifying a plurality of logical regions in the storage device; and
   updating a translation data structure of the storage device, the translation data structure being updated by: calculating a respective predicted load of each of the logical regions by executing a machine learning engine, grouping the logical regions into a plurality of groups based on the predicted loads, and mapping each of the groups to a corresponding memory block of the storage device, the corresponding memory block being selected based on a wear level of the corresponding memory block and the predicted loads of the logical regions in the group,
   wherein the translation data structure is part of a flash translation layer of the storage device, and the translation data structure is configured to store mapping information between a logical address space of the storage device and a physical address space of the storage device, and wherein the machine learning engine is executed in the flash translation layer of the storage device, the flash translation layer including an interface that is configured to provide logical-to-physical address mapping for the storage device.

8. The storage device of claim 7, wherein grouping the logical regions based on the predicted loads causes a distance to be minimized, in any of the groups, between a predicted load of a logical region that has the smallest predicted load in the group and a predicted load of another logical region that has the largest predicted load in the group.

9. The storage device of claim 7, wherein mapping each of the groups to a respective memory block of the storage device includes assigning each of the groups to a respective contiguous physical portion of the storage device.

10. The storage device of claim 7, wherein each of the logical regions includes a page.

11. The storage device of claim 7, wherein the predicted load of any of the plurality of logical regions is based on at least one of (i) a count of write requests that are expected to be received during a future time window, (ii) a count of read requests that are expected to be received during the future time window, (iii) a rate at which write requests are expected to be received during the future time window, (iv) a rate at which read requests are expected to be received during the future time window.

12. The storage device of claim 7, wherein the machine learning engine is trained based on training data, the training data including a read-to-write ratio of any of the logical regions.

13. A non-transitory computer-readable medium storing one or more processor-executable instructions, which when executed by a controller of a storage device cause the controller to perform the operations of:
    identifying a plurality of logical regions in the storage device; and
    updating a translation data structure of the storage device, the translation data structure being updated by: calculating a respective predicted load of each of the logical regions by executing a machine learning engine, grouping the logical regions into a plurality of groups based on the predicted loads, and mapping each of the groups to a corresponding memory block of the storage device, the corresponding memory block being selected based on a wear level of the corresponding memory block and the predicted loads of the logical regions in the group, wherein the translation data structure is part of a flash translation layer of the storage device, and wherein the translation data structure is configured to store mapping information between a logical address space of the storage device and a physical address space of the storage device, and wherein the machine learning engine is executed in the flash translation layer of the storage device, the flash translation layer including an interface that is configured to provide logical-to-physical address mapping for the storage device.

14. The non-transitory computer-readable medium of claim 13, wherein grouping the logical regions based on the predicted loads causes a distance to be minimized, in any of the groups, between a predicted load of a logical region that has the smallest predicted load in the group and a predicted load of another logical region that has the largest predicted load in the group.

15. The non-transitory computer-readable medium of claim 13, wherein mapping each of the groups to a respective memory block of the storage device includes assigning each of the groups to a respective contiguous physical portion of the storage device.

16. The non-transitory computer-readable medium of claim 13, wherein each of the logical regions includes a page.

17. The non-transitory computer-readable medium of claim 13, wherein the predicted load of any of the plurality of logical regions is based on at least one of (i) a count of write requests that are expected to be received during a future time window, (ii) a count of read requests that are expected to be received during the future time window, (iii) a rate at which write requests are expected to be received during the future time window, (iv) a rate at which read that is expected to occur during the future time window.

18. The non-transitory computer-readable medium of claim 13, wherein the machine learning engine is trained based on training data, the training data including a read-to-write ratio of any of the logical regions.

* * * * *